United States Patent [19]

Budininkas et al.

[11] Patent Number: 4,656,831
[45] Date of Patent: Apr. 14, 1987

[54] APPARATUS AND METHOD OF RECOVERING WATER FROM ENGINE EXHAUST GASES

[75] Inventors: Pranas Budininkas, Cicero; Philip A. Saigh, Morton Grove, both of Ill.

[73] Assignee: Chamberlain Manufacturing Corporation, Elmhurst, Ill.

[21] Appl. No.: 733,886

[22] Filed: May 14, 1985

[51] Int. Cl.⁴ .......................... F01N 3/02; F01N 3/10
[52] U.S. Cl. ........................................ 60/297; 60/309; 210/251; 210/679; 422/169; 422/177
[58] Field of Search ............... 60/297, 309; 422/169, 422/177; 210/679, 251

[56] References Cited

U.S. PATENT DOCUMENTS

| | | |
|---|---|---|
| 996,205 | 6/1911 | Bregha . |
| 2,226,134 | 12/1940 | Liebknecht .......................... 210/679 |
| 2,488,563 | 11/1949 | Sills . |
| 2,635,039 | 4/1953 | Peters . |
| 2,789,032 | 4/1957 | Bagley et al. . |
| 2,790,506 | 4/1957 | Vactor . |
| 3,019,780 | 2/1962 | Nuding . |
| 3,313,102 | 4/1967 | Caddell .................................. 60/309 |
| 3,421,315 | 1/1969 | Aoi ......................................... 60/309 |
| 3,464,801 | 9/1969 | Barstow ................................ 60/309 |
| 3,563,029 | 2/1971 | Lowes . |
| 3,656,915 | 4/1972 | Tourtellotte . |
| 3,782,115 | 1/1974 | Johnson ................................ 60/309 |
| 3,949,551 | 4/1976 | Eichler ................................... 60/276 |
| 4,106,913 | 8/1978 | Bunda . |
| 4,132,209 | 1/1979 | Reeler . |
| 4,235,845 | 11/1980 | Bose . |
| 4,263,273 | 4/1981 | Vaseen . |
| 4,285,916 | 8/1981 | Balsden . |
| 4,351,804 | 9/1982 | Biedell et al. . |
| 4,430,303 | 2/1984 | Linde . |

FOREIGN PATENT DOCUMENTS 1100117  3/1955  France .................. 60/309

Primary Examiner—Douglas Hart

[57] ABSTRACT

Water is recovered and purified from exhaust gases of internal combustion engines which produce water vapor when a hydrocarbon fuel is burned. The present invention passes the engine exhaust through a particulate filter then a catalytic reactor to remove the impurities and then through a precooler and a condenser so as to extract the water therein. The water is then passed through a polishing column and recovered for use in the vehicle.

2 Claims, 1 Drawing Figure

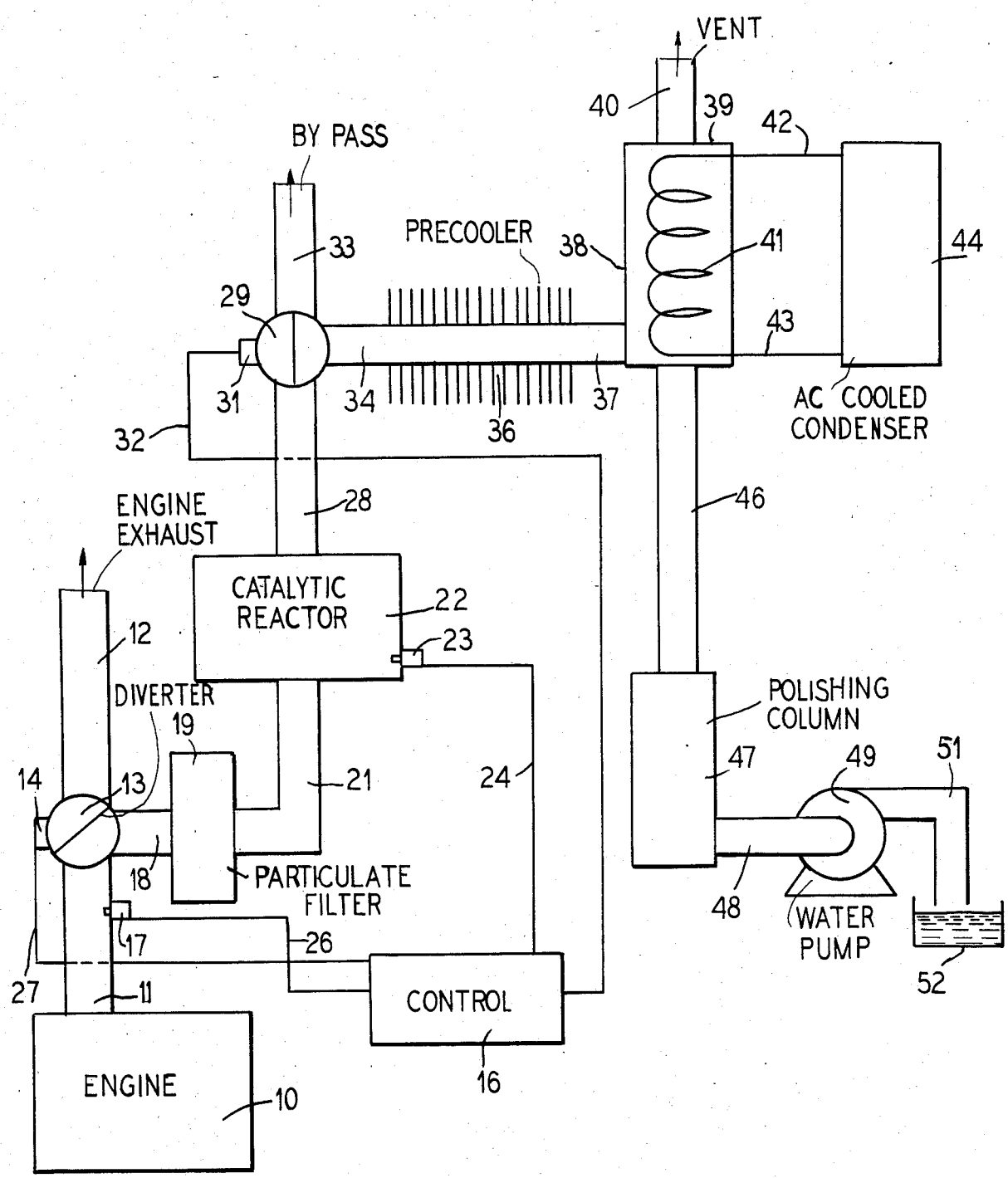

APPARATUS AND METHOD OF RECOVERING WATER FROM ENGINE EXHAUST GASES

BACKGROUND OF THE INVENTION

1. Field of the Invention

The present invention relates to method and apparatus for recovering water from the exhaust of internal combustion engines.

2. Description of the Prior Art

In order to remove pollutants from exhaust gases of internal combustion engines, it has been known to utilize particulate filters and catalytic converters. U.S. Pat. No. 4,263,263 for example, discloses removing particulate material from internal combustion engines such as diesel engines by mixing the exhaust gas with an inert halogenated hydrocarbon liquid having eight or more carbon atoms and absorbing in and entrapping the contaminates. Catalytic reactors are also known for oxidizing hydrocarbons present in exhaust gases.

SUMMARY OF THE INVENTION

The present invention relates to method and apparatus for recovering potable water from the exhaust gases of internal combustion engines.

Combustion of hydrocarbon motor fuels produces water vapor which is expelled with the exhaust gases. The present invention allows the recovery of the water to provide a source of water for potable and other uses. Depending on the type of fuel used, the theoretical amount of water ranges from 0.7 to 1.4 pounds and averages about one pound for each pound of fuel that is burned. When the differences in densities of motor fuel and water and the recovery inefficiencies are taken into account, the volume of the recoverable water ranges from 0.55 to 0.65 gallons per gallon of fuel burned.

The engine exhaust emissions vary as a complex function principally of fuel type and composition as well as the fuel air ratio, the type of engine and mode of its operation, and also factors such as ignition timing, cylinder design and fuel additives. Although the relative concentrations of various exhaust components may change depending on the mode of engine operation, generally the nature of exhaust remains the same and no other components are introduced.

The concentration of water vapor in exhaust gases of either gasoline or diesel engines ranges from 5% for two cycle engines to 10% for four cycle engines by volume. Therefore, if the gas is cooled below 100° to 115° F., water begins to condense. The non-reactive permanent gases present in exhaust such as carbon dioxide, carbon monoxide, oxygen, nitrogen and hydrogen do not condense and do not contaminate the condensate and thus present no problem. The other exhaust components such as hydrocarbons, sulphur dioxide, nitrogen oxides and particulates may contaminate the condensing water by reacting or by merely condensing with water vapor and thus they must be removed to obtain potability and palatability. The principal contaminants requiring removal are various hydrocarbons, and up to 50 hydrocarbons have been observed in exhaust gases, which readily condense with the water vapor. Therefore, a system for the recovery of potable water from the engine exhaust must:

(1) Remove particulates, especially for diesel engines,
(2) Oxidize hydrocarbons to innocuous products such as $CO_2$ and $H_2O$,
(3) Condense water vapor, and
(4) Remove acidic components which are the reaction products of nitrogen oxides and sulphur oxides with condensed water.

The present invention recovers potable water from the engine exhaust by manually or automatically diverting a desired portion of the exhaust gas stream to the water recovery system and then passing the gas through a particulate filter and then through a catalytic converter which is maintained at a temperature sufficient for complete oxidation of hydrocarbons present in the exhaust which normally requires temperatures of 700° to 1200° F. The catalytic converter may contain catalyst consisting of platinum metals, transition metals or mixtures and oxides deposited either on alumina extrusions or honeycomb type monolythic supports. The diversion of the exhaust gas is made at a point where the gas is hot enough to preheat and maintain the temperature of the catalyst bed. During start-up of water recovery hot exhaust gases are passed through the catalytic converter and vented through a bypass valve. When the temperature of the catalytic converter reaches its operating range, the bypass valve is closed and the treated exhaust gas flows to a water condenser. The treated exhaust gas is cooled by an air precooler to approximately 120° to 150° F. in the air precooler and is then further cooled in an air conditioner cooled condenser to approximately 65°–75° F. where condensation of water occurs. The non-condensable gases are vented and the condensed water is pumped or passed by gravity through a polishing bed for removal of acidic components and then to a storage tank. The unpolished condensate has a pH of approximately 2; however, the pH is adjusted to an essentially neutral value where the pH is 6–7 by using a polishing bed containing either suitable ion exchange resins or limestone chips.

The effectiveness of the water recovery system can be illustrated by comparing a condensate collected directly from the exhaust of a gasoline engine with the recovered water after treatment of engine exhaust by the system of invention:

| Untreated Condensate | Treated Condensate |
| --- | --- |
| Oily, Yellow | Clear, colorless |
| Gasoline odor | No odor |
| High concentration of hydrocarbons | No hydrocarbons, or in the low ppm range |
| pH = 2 | pH = 2 before polishing filter |
| | pH = 6–7 after polishing filter |

Thus, the present invention allows recovery of potable water from the exhaust gases of internal combustion engines.

Other objects, features, and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

The FIGURE illustrates the water recovery apparatus of the invention.

DESCRIPTION OF THE PREFERRED EMBODIMENTS

The FIGURE illustrates an engine 10 which might be any type of internal combustion engine as, for example, a diesel or gasoline engine which has an exhaust 11 in which a diverter valve 13 is mounted that is controlled by a solenoid 14 so as to divert all or a portion of the engine exhaust from the exhaust outlet 12 to the conduit 18. A particulate filter 19 receives diverted exhaust gases from conduit 18 and removes particulates. Such filter might be of the type disclosed in U.S. Pat. No. 3,563,029 for example. A particulate filter is not required for gasoline engines but is required for diesel engines. A pipe 21 supplies the output of the filter 19 to a catalytic converter 22 which is maintained at a temperature sufficient for complete oxidation of the hydrocarbons present in the exhaust gas which would normally be in the 700°–1200° F. range. The catalytic converter may contain catalyst consisting of platinum metals, transition metals, mixtures and/or oxides thereof which are deposited either on alumina extrusions or honeycomb type monolithic supports. The diversion of the exhaust gas is made at a point where the gas is hot enough to preheat and maintain the temperature of the catalyst bed.

During start-up of the water recovery, hot exhaust gas is passed through the catalytic converter and vented through pipe 28 and bypass valve 29 to atmosphere through pipe 33. The bypass valve 29 is controlled by control 31. When the temperature of the catalytic converter reaches its operating range, the bypass valve 29 is closed and the treated exhaust gas flows through pipe 34 to a precooler 36 which is an air precooler and cools the gases to approximately 120°–150° F. A pipe 37 supplies the precooled gases to a condenser 38 which is cooled with an air conditioner 44 which is connected by tubes 42 and 43 to a cooling coil 41 mounted in the condenser 38. The condenser 38 cools the gases to approximately 65°–75° F. and the water condenses in the condenser 38 and passes through pipe 46 either by gravity or by a pump, not shown, to a polishing column 47. The non-condensible gases are vented from the condenser 38 through a vent 40.

The polishing column 47 comprises a polishing column containing an ion exchange on limestone bed and removes the acidic components from the water. The water in pipe 46 from the condenser 38 has a pH of approximately 2 and the polishing column 47 changes the pH to an essentially neutral value with the pH=6–7.

Ion exchange devices utilizing ion exchange resins are known in the art and, for example, are described in the Chemical Engineering Handbook of Perry and Chilton, 5th Edition, published in 1973 and are described on pages 16-10 and 16-11. Hydroxide-ion exchanges are acid uptake devices containing weak-base resins including certain resins classified as "intermediate bases" which act as absorbents for strong acids. Thus, water which has been "decationized" and "degasified" may be converted to "deionized" water by passage through such resin. Anion resins are regenerated with NaOH solution, for example.

The pipe 48 supplies the clarified and neutralized water to a pump 49 which supplies it to a water reservoir 52 through a pipe 51.

A control 16 is connected to the temperature sensor 17 mounted in pipe 11 by electrical lead 26 and to a sensor 23 for sensing temperature mounted in the catalytic reactor 22 by a lead 24. The control is connected by a lead 27 to the controller 14 for valve 13 and to the controller 31 for valve 29 by a lead 32 so as to actuate these valves when the temperature in the exhaust pipe 11 and in the catalytic reactor 22 are appropriate as described above.

It is seen that this invention provides a new and novel apparatus and method for purifying water from engine exhaust and although it has been described with respect to preferred embodiments it is not to be so limited as changes and modifications may be made therein which are within the full intended scope as defined by the appended claims.

We claim as our invention:

1. Apparatus for recovering potable water from engine exhaust gases comprising, a particulate filter to which said engine exhaust gases are supplied, a catalytic reactor receiving the gases from said particulate filter, a condenser connected to receive the output gases of said catalytic reactor and cooling the output gases to a temperature such that the water condenses, and a water neutralizing means receiving the water which may contain some acid from said condenser and purifying and clarifying it to render it potable, wherein said engine has an exhaust pipe, a diverter valve with controller mounted in said engine exhaust pipe, a diverter pipe connected from said diverter valve to said particulate filter, a temperature sensor mounted in said engine exhaust pipe, and a control means receiving an input from said temperature sensor and connected to said controller of said diverter valve to actuate it to divert engine gases to said particulate filter when the temperature of said engine gases has reached a predetermined temperature.

2. Apparatus according to claim 1 including a by-pass valve and controller connected between said catalytic reactor and said condenser, a second temperature sensor mounted to sense the temperature of said catalytic reactor and supplying an input to said control means, said control means connected to the controller of said by-pass valve to actuate it to supply exhaust gases to said condenser when the temperature of said catalytic reactor reaches a predetermined temperature.

* * * * *